Sept. 25, 1962

L. E. BECKER 3,055,630

PUSH BUTTON ACTUATORS FOR FLUSH VALVES

Filed Feb. 26, 1959

INVENTOR.
LYMAN E. BECKER

BY

ATTORNEYS

United States Patent Office 3,055,630
Patented Sept. 25, 1962

3,055,630
PUSH BUTTON ACTUATORS FOR FLUSH VALVES
Lyman E. Becker, 1012 S. 33rd St., Milwaukee, Wis.
Filed Feb. 26, 1959, Ser. No. 795,790
5 Claims. (Cl. 251—45)

My invention relates to valves, and more particularly to valves of the type using the pressure of a fluid to seat the valve and with a relief valve associated therewith so as to diminish the pressure from time to time so as to open the valve, such valves being used in combination with plumbing fixtures or the like.

Many valves of the differential pressure type use a second valve to relieve the pressure on the valve closing member to thereby diminish the valve member closing force and open the valve. Valves of this general type often times have a valve closing member in the form of a diaphragm or piston which is subjected to the pressure of the fluid passed through the valve in such fashion that one side of the valve closing member is subjected to the pressure from the inlet to the valve in a valve opening direction while the other side of the member is subjected to the same pressure but over a relatively larger area so that the closing force exerted on the member may from time to time exceed the opening forces.

The present invention is directed to simple and efficient means for operating valves of this general class and is particularly concerned with improvements which facilitate the maintenance of the valve in an open condition for a preselected interval of time.

The primary object of the invention is to provide simple and efficient operating facilities for the relief valves of the foregoing type.

Other objects of the invention will be apparent from the following specification when taken with the accompanying drawings in which.

Figure 1:
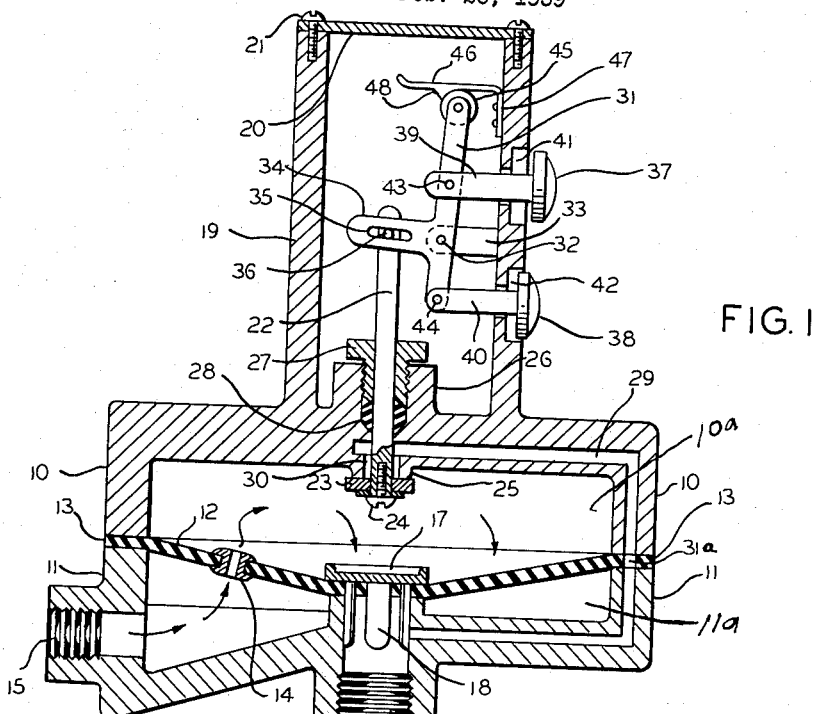
FIGURE 1 is a vertical cross-sectional view of the valve incorporating the features of one embodiment of my invention, showing the valve in a closed position when manually controlled.
Figure 2:
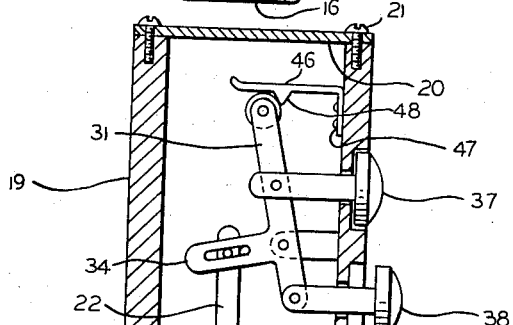
FIGURE 2 is a similar view of the valve shown in FIGURE 1 in an open position.

Similar characters of reference indicate corresponding parts throughout the several views, and referring now to the same, the character 10 designates the top or upper portion of the valve enclosure or body, and the character 11 designates the lower section of the valve body. Obviously these upper and lower sections 10 and 11, respectively, may be attached to one another in any conventional and practical manner.

A valve closing member in the form of a diaphragm 12 is disposed between the sections 10 and 11, and held in engagement thereby on their flat surfaces 13 extending around their entire outer edges. The diaphragm 12 is constructed of pliable material such as rubber or the like, and has a restricted by-pass opening 14 extending therethrough to allow flow from the inlet to the space above member 12.

The member 12 thus divides the space within the body defined by the two sections into a fluid inlet chamber 11a on one side of the member and a second chamber 10a on the other side of the member. It should be noted that the area of the member exposed to the pressure in chamber 10a is larger than the area exposed to the pressure in chamber 11a so that when the pressures in the two chambers are equal, the member 12 will be closed upon its seat.

The lower section 11 of the valve enclosure is equipped with a threaded inlet 15 and a threaded outlet 16, and a valve member 17 consisting of a flat disc having downwardly extending guides 18, is disposed centrally within the diaphragm 12, and the guides 18 slidably engage the inner surface of the outlet 16.

The upper section 10 of the valve enclosure has an operating housing 19 extending upward therefrom, the upper end of which housing is provided with a cover diagrammatically represented at 20 and shown held in position by means of the screws 21.

A vertical valve stem 22 extends centrally through the top of the upper portion 10 and supports a relief valve member 23 at its lower end, the valve 23 being attached to the stem 22 by means of the screw 24. The valve 23 engages a seat 25 forming an integral part of the upper wall of section 10. The upper face of the section 10 has an upwardly extending threaded portion 26 surrounding the stem 22 and supporting a threaded stuffing nut 27 which is employed for retaining a packing 28 within the portion 26 to seal the opening between the slidable stem 22 and the section 10.

A tubular relief duct or passage 29 extends from the opening 30 of the upper section 10, to the outlet 16 of the lower section 11. This duct 29 is shown disposed within the walls of the upper and lower sections 10 and 11 respectively. It will be noted that the diaphragm 12 is equipped with an aperture 31a to prevent obstruction of, and in direct alignment with, the duct 29.

An actuating lever 31 in the form of a rocker link is pivotally supported intermediate its ends at 32 by an arm 33 extending into the housing 19. A lever 31 has one arm 34 thereof equipped with an elongated slot 35 engaging a pin 36 in the upper end of the valve stem 22.

A pair of push buttons 37 and 38 respectively, are mounted on push rods or links 39 and 40, which are adapted for sliding movement through openings 41 and 42 in the side wall of the housing 19.

The rod 39 is pivotally connected at 43 to the lever 31 and the arm 40 is pivotally connected at 44 to the lever 31 on the other side of pivot 32. The upper end of the lever 31 is shown equipped with a roller 45 arranged for engagement with a resilient leaf spring 46 attached to the wall of the housing 19 at 47. The bottom of the spring 46 is shown provided with a downwardly extending lug or projection 48 intermediate the ends thereof and the roller 45 is held in engagement with the lug 48 either on one side or the other, depending on which push button 37 or 38 is pushed inward.

From the above description of my invention, it will become manifest that when the device is attached to a water supply at its inlet 15, and the push button 38 is inwardly disposed, that the valve 23 will be in a closed position as shown in FIGURE 1, permitting the water entering the inlet 15 under pressure, to seep upward through the by-pass opening 14 in the diaphragm 12 into the enclosure above the diaphragm 12, thus forcing the valve member 17 of the diaphragm against the seat of the outlet 16. When the push button 37 is forced inward manually, the roller 45 will assume a position on the opposite side of the lug 48 on the spring 46, and the valve stem 22 will be forced downward to open the relief valve 23 above the diaphragm 12, and the water will be free to flow through the duct 29 out of the outlet 16, thereby relieving the pressure above the diaphragm and causing the water entering the inlet 15 to raise the diaphragm 12 and open the outlet 16 of the valve enclosure for flow therethrough.

The valve may be closed by pushing inwardly on button 38 which thereby closes relief valve 23 and closes diaphragm 12.

The valve illustrated herein is positive in action in that the push buttons 37 and linkages impart a positive opening thrust to the relief valves.

The actuating linkage for the valve is so arranged as to facilitate a "snap action" of the relief valve in moving to the fully open or fully closed position. The spring 46 offers an initial resistance to both opening and closing movement, which, when overcome, allows the relief valve 23 to be quickly moved to the fully opened or closed position. In this connection it should be noted that the projection 48 will cam the roller 45 and arm 31 toward the open or closed position after the arm has passed the "dead center" position.

The valve is particularly well suited for high pressure or large quantity flow installations, while at the same time requiring a relatively small amount of operator force for their actuation.

Whereas I have shown and described two operative form of my invention, I wish it to be understood that this showing is to be taken in an illustrative or diagrammatic sense only. There are many modifications to the invention which will be apparent to those skilled in the art and which will fall within the scope and spirit of the invention. The scope of the invention should be limited only by the scope of the hereinafter appended claims.

I claim:

1. In a relief valve actuator for valves of the differential pressure type having a valve closing member dividing an internal chamber of a valve body into an inlet pressure space and an operating pressure space with by-pass means providing for a build up of pressure in said operating pressure space to thereby close said valve closing member, a relief valve of greater flow capacity than said by-pass for said operating chamber, the improvement comprising a linkage interconnected with the stem of said relief valve for opening and closing said relief valve, said linkage including a rocker arm pivoted to a portion of said valve body and interconnected with said stem and a pair of push button actuators for said rocker arm, said actuators being connected to said rocker arm for opening and closing movement of said relief valve upon inward movement of one or the other of said push buttons, and a resilient means for restraining said movement of said rocker arm toward both the opened and closed position.

2. The structure of claim 1 wherein said resilient means is in the form of a leaf spring having a projection thereon engageable with a roller on said rocker arm.

3. In an operating system for valves of the differential pressure type having a valve body with an inlet and an outlet therein and a valve closing member dividing an operating space in said body into an inlet pressure chamber and a second chamber, restricted means allowing communication between said chambers, the valve closing member being adapted to seat upon and close said outlet in response to a build up in pressure in said second chamber, the improvement comprising a pressure relief passage of larger cross sectional area than said restricted means for said second chamber, and a valve closing member adapted in one position thereof to close said passage and in another position thereof to open said passage to the second chamber to thereby allow opening of said main valve, an operating stem aforesaid relief valve and a link connected to said stem to cause opening and closing movement of said stem when said link is moved in opposite directions, a first push button connected to said link and a second push button connected to said link, said buttons being adapted to cause movement of said link and said stem in opposite directions when one or the other of said buttons is moved by an operator with movement of one button causing movement of the link in one direction and movement of the other button causing movement of said link in the opposite direction, and releasable resilient means opposing movement of said link in both directions, said resilient means being releasable in response to a predetermined operator force imposed on one or the other of said buttons.

4. The structure of claim 3 wherein said resilient means is in the form of a leaf spring and said link has a roller engageable with said spring, said spring having a projection thereon engageable with said roller when said relief valve is in the fully open or fully closed position.

5. In an operating system for valves of the differential pressure type having a valve body with an inlet and an outlet therein and a valve closing member dividing an operating space in said body into an inlet pressure chamber and a second chamber, restricted means allowing communication between said chambers, the valve closing member being adapted to seat upon and close said outlet in response to a build up in pressure in said second chamber, the improvement comprising a pressure relief passage of larger cross sectional area than said restricted means for said second chamber, and a valve closing member adapted in one position thereof to close said passage and in another position thereof to open said passage to the second chamber to thereby allow opening of said main valve, an operating linkage housing positioned on said valve body and having a rocker arm pivotally mounted therein, said relief valve having an operating stem interconnected with said rocker arm, a pair of push buttons slidably mounted in said linkage housing and pivoted to said rocker arm, said push buttons being connected with said rocker arm for movement of said rocker arm in opposite directions upon movement of one or the other of said buttons inwardly with relation to said housing, and resilient means for releasably holding said rocker arm in a position corresponding to the fully opened position of said relief valve and for holding said rocker arm in a position corresponding to the fully closed position of said relief valve.

References Cited in the file of this patent

UNITED STATES PATENTS

| | | |
|---|---|---|
| 1,351,161 | Fagerlund | Aug. 31, 1920 |
| 1,424,404 | Hartman | Aug. 1, 1922 |
| 1,907,683 | Lews | May 9, 1933 |
| 2,725,894 | Mamoli | Dec. 6, 1955 |
| 2,764,994 | Nelson | Oct. 2, 1956 |
| 2,772,067 | Wilson | Nov. 27, 1956 |
| 2,788,789 | Asplund | Apr. 16, 1957 |
| 2,875,976 | Harwood | Mar. 3, 1959 |

FOREIGN PATENTS

| | | |
|---|---|---|
| 546,021 | Canada | Sept. 10, 1957 |